UNITED STATES PATENT OFFICE.

CASPAR JOSEPH BREIDBACH AND CARL BREIDBACH, OF NEW YORK, N. Y.

IMPROVEMENT IN PROCESSES OF PREPARING CARMINE PRINTING-INK.

Specification forming part of Letters Patent No. 168,134, dated September 28, 1875; application filed March 23, 1875.

*To all whom it may concern:*

Be it known that we, CASPAR JOSEPH BREIDBACH and CARL BREIDBACH, both of New York, in the county of New York and State of New York, have invented a new and Improved Process of Preparing Carmine Printing-Ink, of which the following is a specification:

Our invention has for its object to overcome the necessity of grinding carmine in oil for making it into printing-ink; the grinding process and the necessity of using very smooth and costly grinding implements making the ordinary carmine printing-ink so costly that very few printers can afford to use it.

Our invention consists in dissolving the carmine instead of grinding it, thereby reducing it, without labor, into the condition in which it is necessary to be for printing purposes, dispensing with the use of oil in grinding, and that of the costly implements now employed in the preparation of carmine printing-ink.

In preparing our ink we proceed as follows: In order to make one pound of printing-ink, we use about three ounces of carmine, as the same is brought into market. This carmine we mix with about one tea-spoonful of aqua ammonia and about eight tea-spoonfuls of water, and stir the mixture well, in order to bring every particle of the carmine into contact with the aqua ammonia. The paste thus produced is allowed to stand in contact with the atmosphere for about twenty-four hours, being stirred at intervals of about five hours or so, to bring new surfaces in contact with the atmosphere. After the lapse of the twenty-four hours we add about one-half the quantity of aqua ammonia and water to the paste, and mix and stir again, the second addition completing the dissolution of the carmine, rendering it perfect for the purpose for which we intend it. Varnish is now added to the mixture, enough to complete the pound, and the whole is then again stirred until it becomes stiff, when it is in condition for use.

The same process may be followed for making painters' carmine, with the only exception that less water would be employed, and oil finally used in place of the varnish.

Thus it will be seen that we complete the ink, without grinding the carmine, by a judicious solution, thereby reducing the expense of the article to a very great extent. The solution will, moreover, reduce the carmine to a much finer degree than the grinding process.

We are fully aware that it is common to dissolve carmine in aqua ammonia, and do not claim such solution, as our invention consists in the peculiar duplicated process and final admixture of varnish; and

We claim as our invention—

The process herein described of producing carmine printing-ink by first dissolving the carmine in aqua ammonia, then allowing the mixture to stand for twenty-four hours, next adding half the quantity of aqua ammonia originally used, and finally mixing with varnish, substantially as specified.

CASP. JOS. BREIDBACH.
   CARL BREIDBACH.

Witnesses:
 E. C. WEBB,
 A. V. BRIESEN.